US012811278B2

(12) United States Patent
Lindoff

(10) Patent No.: US 12,811,278 B2
(45) Date of Patent: Nov. 24, 2026

(54) ELECTRONIC DEVICE AND A BASEBAND PROCESSOR

(71) Applicant: BEAMMWAVE AB, Lund (SE)

(72) Inventor: Bengt Lindoff, Bjärred (SE)

(73) Assignee: BEAMMWAVE AB, Lund (SE)

( * ) Notice: Subject to any disclaimer, the term of this patent is extended or adjusted under 35 U.S.C. 154(b) by 147 days.

(21) Appl. No.: 18/693,506

(22) PCT Filed: Sep. 13, 2022

(86) PCT No.: PCT/SE2022/050807
§ 371 (c)(1),
(2) Date: Mar. 19, 2024

(87) PCT Pub. No.: WO2023/048612
PCT Pub. Date: Mar. 30, 2023

(65) Prior Publication Data

US 2024/0387982 A1 Nov. 21, 2024

(30) Foreign Application Priority Data

Sep. 24, 2021 (SE) .................................... 2130260-9

(51) Int. Cl.
*H01Q 1/24* (2006.01)
*H01Q 3/24* (2006.01)
(Continued)

(52) U.S. Cl.
CPC ............. *H01Q 1/243* (2013.01); *H01Q 3/242* (2013.01); *H01Q 5/385* (2015.01);
(Continued)

(58) Field of Classification Search
CPC ........ H01Q 1/243; H01Q 3/242; H01Q 5/385; H01Q 19/005; H01Q 21/245; H01Q 21/28;
(Continued)

(56) References Cited

U.S. PATENT DOCUMENTS

2004/0137852 A1* 7/2004 Shi ........................... H04B 1/30
455/73
2011/0300885 A1 12/2011 Darabi et al.
(Continued)

FOREIGN PATENT DOCUMENTS

EP 3313124 A1 4/2018
EP 3772826 A1 2/2021
GB 2459919 A 11/2009

OTHER PUBLICATIONS

International Search Report and Written Opinion for International Application No. PCT/SE2022/050807, dated Oct. 24, 2022.
(Continued)

*Primary Examiner* — Michael M Bouizza
(74) *Attorney, Agent, or Firm* — MARSHALL, GERSTEIN & BORUN LLP

(57) ABSTRACT

An electronic device comprising: a first antenna and a second antenna; first radio frequency, RF, circuitry and second RF circuitry, the first RF circuitry being connected to the first antenna and the second RF circuitry being connected to the second antenna and each of the first and the second RF circuitry comprising one or more of a Low Noise amplifier, a Mixer, a Local oscillator, a Phase locked loop, an analog filter, a Voltage Gain Amplifier, an analog to digital converter, ADC, a digital filter, a Power Amplifier and a digital to analog converter, DAC; and a baseband processor, connected or connectable via a zero-intermediate frequency, zero-IF, signal to the first and the second RF circuitries; and wherein the first antenna is integrated together with the first RF circuitry in a first encapsulation, the second antenna is integrated together with the second RF circuitry in a second encapsulation, the second encapsulation preferably being different from the first encapsulation, and wherein the first and second antennas have different
(Continued)

orientations. A corresponding baseband processor is also disclosed.

9 Claims, 6 Drawing Sheets

(51) Int. Cl.

| | |
|---|---|
| ***H01Q 5/385*** | (2015.01) |
| ***H01Q 19/00*** | (2006.01) |
| ***H01Q 21/24*** | (2006.01) |
| ***H01Q 21/28*** | (2006.01) |
| ***H04B 1/3827*** | (2015.01) |
| ***H04B 1/401*** | (2015.01) |
| ***H04B 7/0404*** | (2017.01) |

(52) U.S. Cl.
CPC ......... *H01Q 19/005* (2013.01); *H01Q 21/245* (2013.01); *H01Q 21/28* (2013.01); *H04B 1/3833* (2013.01); *H04B 1/401* (2013.01); *H04B 7/0404* (2013.01)

(58) Field of Classification Search
CPC .......... H01Q 3/24; H01Q 9/045; H01Q 21/08; H01Q 21/205; H01Q 21/24; H04B 1/3833; H04B 1/401; H04B 7/0404; H04B 1/3827
See application file for complete search history.

(56) References Cited

U.S. PATENT DOCUMENTS

| | | | | |
|---|---|---|---|---|
| 2016/0365886 | A1* | 12/2016 | Prendergast | H04W 52/18 |
| 2017/0214519 | A1 | 7/2017 | Park et al. | |
| 2019/0165454 | A1 | 5/2019 | Lee et al. | |
| 2019/0317177 | A1* | 10/2019 | Ertan | G01S 13/42 |
| 2020/0021015 | A1 | 1/2020 | Yun et al. | |
| 2020/0083948 | A1 | 3/2020 | Lim et al. | |
| 2021/0013632 | A1 | 1/2021 | Lee et al. | |
| 2021/0021052 | A1 | 1/2021 | Yu et al. | |
| 2021/0044026 | A1* | 2/2021 | Cho | H01Q 1/38 |

OTHER PUBLICATIONS

Sweden Search Report for Application No. 2130260-9, dated May 13, 2022.

* cited by examiner

Prior Art: mmW Smartphone

ELECTRONIC DEVICE AND A BASEBAND PROCESSOR

CROSS-REFERENCE TO RELATED APPLICATIONS

This present application is the US National Phase of International Patent Application No. PCT/SE2022/050807, filed Sep. 13, 2022, which claims priority to Sweden Application No. 2130260-9, filed Sep. 24, 2021. These applications are hereby incorporated by reference in their entireties.

TECHNICAL FIELD

The present disclosure relates to an electronic device and a baseband processor. More specifically, the disclosure relates to an electronic device and a baseband processor as defined in the introductory parts of the independent claims.

BACKGROUND ART

Wireless communication is expanding to new radio spectrum parts in order to meet the requirements for higher data rates. For example, the newly defined fifth generation (5G) new radio (NR) standard not only introduces new services (e.g., low latency high reliability services), but also supports increased capacity and higher data rates.

To facilitate capacity increase, NR introduces wireless communication on millimeter wavelength (mmW) radio frequencies (e.g., frequency bands above 10 GHZ, such as the 28 GHz frequency band or the 39 GHz frequency band). Due to the fact that mmW radio frequencies typically entail higher path loss than lower frequency signaling, cells of a mmW cellular wireless communication system will typically cover smaller areas than those of a lower frequency communication system. Therefore, communication devices supporting 5G NR in the mmW frequency range will typically support also wireless communication using lower frequencies (e.g., below 6 GHz) for coverage.

One advantage with mmW transmission is that the short wavelength enables use of small antennas, which in turn makes it possible to have massive-MIMO transceiver arrangements comprised in small (e.g., handheld) wireless communication devices. For example, it may be possible to fit antenna panels with, e.g., 4×2 antennas in a module having a size of approximately 25×10 mm. This advantage enables application of beamforming for mmW, which may significantly increase the cellular capacity and/or coverage. Transceiver architectures for Massive MIMO and beamforming are generally realized in two different ways—analog and digital beamforming. However, in some applications hybrid beamforming is employed, which may be understood as a combination of the two. In more detail, analog beamforming (FIG. 1) is performed at the Radio Frequency (RF) chip through a bank of phase shifters, one per antenna element, and an analog power combiner (receiver) and power splitter (transmitter). The beam direction of the combined radio signal of the antenna array can by controlled by tuning the phase shifters. Different, or the same, directions may be applied for transmission and reception. This architecture only requires one pair of analog-to-digital converters (ADC) and digital-to-analog converters (DAC) at the receiver and transmitter, respectively, reducing the complexity. The antenna elements are typically clustered and implemented in an antenna panel.

A disadvantage with analog beamforming is that the antenna array can only apply a single (transmit and/or receive) beam at the same time. This leads to that simultaneous multi-user scenarios are not possible. Furthermore, abrupt changes of channel conditions (e.g., due to blocking of antennas, rotation of the transceiver, etc.) are hard to track with a single beam limitation. Thus, there is a high risk of signal outage in connection with abrupt changes of channel conditions. Digital beamforming may provide increased flexibility compared to analog beamforming. In digital beamforming implementations, the beamforming is performed in the digital baseband (BB) chip. Each transceiver chain has a pair of ADCs at the receiver and DACs at the transmitter enabling the transceiver to simultaneously direct beams in, theoretically, an infinite number of directions at a given time. Thereby, several beams can be tracked simultaneously, and it may be possible to follow fast changes of channel conditions, thereby improving receiver and/or transmitter performance. Moreover, digital beamforming provides advantages from a flexibility of antenna placement point of view, especially in handheld devices, where the antennas generally need to be distributed over the device in order to combat blocking of the mmW radio signals caused by e.g., hand-placement while handling the device. Furthermore, some digital beamforming architectures comprise multiple (N) analog mmW RF chips or modules that are connected to a baseband chip via an analog interface. Each analog mmW RF chip comprises one or more antennas, front-end receiver (TRX) and front-end transmitter (TRX), as well as an analog baseband receiver and transmitter filter. The output analog baseband signal (from each mmW RF chip) is input to each of the N inputs of the baseband chip. The baseband chip is accordingly provided with N ADCs/DACs and suitable pre-processing and coding/decoding circuitry. Such an architecture is disclosed in in e.g., US 2019/0199380 A1.

However, other digital beamforming architectures utilize a digital interface between the N number of mmW RF chips and the baseband chip. In contrast to the analog interface realization, in the digital interface realization some of the circuitry (e.g., ADCs, DACs, and digital filters) is provided in the mmW RF chip instead of the baseband chip. Accordingly, the output from each mmW RF chip is a digital signal over the digital interface, which is provided to the inputs of the baseband chip, which comprises the pre-processing circuitry and the coding/decoding circuitry. Going to a digital interface, and incorporating ADC/DACS in the RF chips, it may also be possible to have serial connection between the TRX chips as shown in e.g., WO 2020/052880 A1.

Current mmW radio architectures in smartphones are based on analog beamforming. Due to the risk of blocking antenna panels with a hand, there are several antenna panels 10*a*, 10*b*, 10*c* included in the smartphone 1, and distributed in different orientations (in a XYZ coordinate system) as seen in FIG. 10. The dashed arrows show the main antenna gain direction for the respective antenna panel 10*a*, 10*b*, 10*c*. The antenna panels 10*a*, 10*b*, 10*c* are connected to a mmW radio chip 15, down converting the mmW radio signal to a sub 6 GHz radio signal. Then a switch 16 selects which of the antenna panels 10*a*, 10*b*, 10*c* is used (i.e., only a single antenna panel is enabled at the time). The signal from the mmW chip is then sent to the sub 6 GHz RF chip 17 and then down converted to a baseband signal and sent to a BB processing unit 19. An example of analog beamforming with several antenna panels included in an electronic device is given in U.S. Pat. No. 11,025,285 B2.

The current smartphone implementation with antenna panels has the disadvantages that it is bulky, and that in case the antenna panel directed towards the network node is blocked by a hand, another antenna panel, with a much worse radio channel/signal quality towards the NW node needs to be used implying significant signal loss and hence lower data rates or even result in a dropped radio link.

US 2021/0013632 A1 discloses an apparatus for processing signals through Radio Frequency (RF) chains. However, US 2021/0013632 A1 is silent regarding the problem of blocking of signals, e.g., by a hand, in handheld devices.

Therefore, there is a need for mmW RF architectures handling the problem of blocking of signals (e.g., by a hand) in handheld devices. There may also be a need for space saving solutions.

SUMMARY

An object of the present disclosure is to mitigate, alleviate or eliminate one or more of the above-identified deficiencies and disadvantages in the prior art and solve at least the above-mentioned problem.

According to a first aspect there is provided an electronic device. The electronic device comprises a first antenna and a second antenna. Furthermore, the electronic device comprises first radio frequency, RF, circuitry and second RF circuitry. the first RF circuitry is connected to the first antenna. The second RF circuitry is connected to the second antenna. Each of the first and the second RF circuitry comprises one or more of a Low Noise amplifier, a Mixer, a Local oscillator, a Phase locked loop, an analog filter, a Voltage Gain Amplifier, an analog to digital converter, ADC, a digital filter, a Power Amplifier and a digital to analog converter, DAC. The electronic device comprises a baseband processor, connected or connectable via a zero-intermediate frequency, zero-IF, signal to the first and the second RF circuitries. The first antenna is integrated together with the first RF circuitry in a first encapsulation. The second antenna is integrated together with the second RF circuitry in a second encapsulation. The second encapsulation is preferably different from the first encapsulation. The first and second antennas have different orientations. By placing antennas in different orientations/directions, the antenna radiation around the electronic device becomes more spherical, thus improving performance and/or signal quality/strength (and/or user satisfaction) of the radio communication.

According to some embodiments, the second encapsulation is different from the first encapsulation.

According to some embodiments, the first and second encapsulations have different orientations.

According to some embodiments, the electronic device further comprises a third antenna and third RF circuitry, and the baseband processor is connected via a zero-IF signal, to the third RF circuitry and the third antenna is integrated together with the third RF circuitry in a third encapsulation different from the first and second encapsulations.

According to some embodiments, the first, second and third antennas have different orientations.

According to some embodiments, each of the first, second and third RF circuitry is configurable to be in either an operating mode, in which reception or transmission of radio signals is performed via the respective antenna, or in a stand-by mode, in which no reception or transmission of radio signals is performed.

According to some embodiments, the baseband processor is configured to set each of the first, second and third RF circuitry in either the operating mode or the stand-by mode based on radio signal strength and/or signal to noise ratio, SNR, measurements.

According to some embodiments, the baseband processor is configured to set each of the first, second and third RF circuitry in either the operating mode or the stand-by mode based on information from one or more sensors, such as a camera, a fingerprint sensor, or a touch sensitive sensor.

According to some embodiments, the electronic device further comprises: a fourth and a fifth antenna (108, 109); and fourth RF circuitry and fifth RF circuitry. The fourth RF circuitry is connected to the fourth antenna and the fifth RF circuitry is connected to the fifth antenna. Each of the fourth and the fifth RF circuitry comprises one or more of a Low Noise amplifier, a Mixer, a Local oscillator, a Phase locked loop, an analog filter, a Voltage Gain Amplifier, an ADC, a digital filter, a Power Amplifier, and a DAC. The fourth antenna is integrated together with the fourth RF circuitry in the first encapsulation. The fifth antenna is integrated together with the fifth RF circuitry in the second encapsulation. The first and second antennas have vertical polarization and the fourth and fifth antennas have horizontal polarization.

According to some embodiments, all the RF circuitries being set to the operating mode communicates with a first network, NW, node.

According to some embodiments, the first RF circuitry communicates with a first NW node when in the operating mode and the second RF circuitry communicates with a second NW node when in the operating mode.

According to some embodiments, the first, second and third antennas have different orientations and the orientations of the first, second and third antennas are separated with at least 90 degrees in at least one of an XY-, YZ- or XZ-plane.

According to some embodiments, the baseband processor is configured to set each of the first, second and third RF circuitry in either the operating mode or the stand-by mode based on radio signal strength measurements and based on information from one or more of a camera, a fingerprint sensor and a touch sensitive sensor.

According to a second aspect there is provided a baseband processor connectable to first, second and third RF circuitries via a zero-intermediate frequency, zero-IF signal, the baseband processor being configured to set each of the first, second and third RF circuitry in either an operating mode, in which reception and/or transmission of radio signals is performed via an antenna connected to the respective RF circuitry, or a stand-by mode, in which no reception or transmission of radio signals is performed, based on radio signal signal strength and/or information from one or more of a camera, a fingerprint sensor and a touch sensitive sensor.

According to some embodiments, the baseband processor is configured to set each of the first, second and third RF circuitry in either the operating mode or the stand-by mode based on radio signal strength and information from one or more of a camera, a fingerprint sensor and a touch sensitive sensor.

Effects and features of the second aspect is to a large extent analogous to those described above in connection with the first aspect and vice versa. Embodiments mentioned in relation to the first aspect are largely compatible with the second aspect and vice versa.

An advantage of some embodiments is that less (physical) space is needed for components in the electronic device, thus facilitating placement of components in the electronic device and/or reducing the size of the electronic device.

Another advantage of some embodiments is that the negative impact of blocking of signals, e.g., by a hand, is prevented or mitigated.

Yet another advantage of some embodiments is that a better radio signal quality is provided and/or that radio signal loss is reduced.

A further advantage of some embodiments is that power consumption is reduced.

Yet a further advantage of some embodiments is that higher data rates are provided.

Another advantage of some embodiments is that the dropping of a radio link is prevented or mitigated.

Yet another advantage of some embodiments is that the antenna radiation around the electronic device becomes more spherical, thus improving performance/quality (and user satisfaction) of the radio communication.

A further advantage of some embodiments is that routing is facilitated, simplified and/or reduced.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such apparatus and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features, and advantages of the present disclosure, will be more fully appreciated by reference to the following illustrative and non-limiting detailed description of example embodiments of the present disclosure, when taken in conjunction with the accompanying drawings.

Figure 5B:
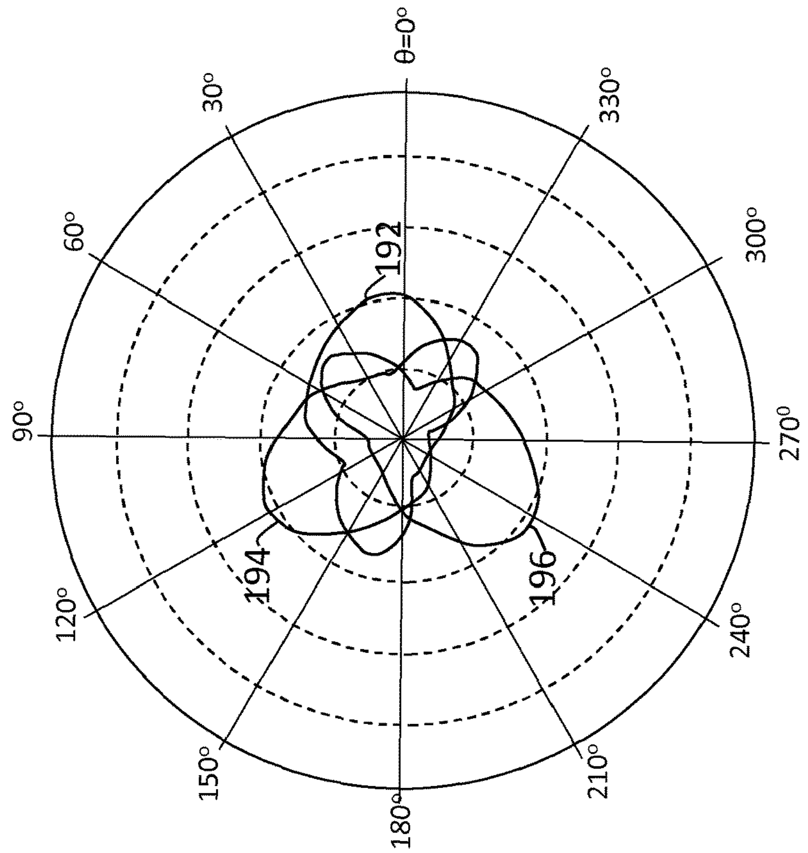
Figure 5A:
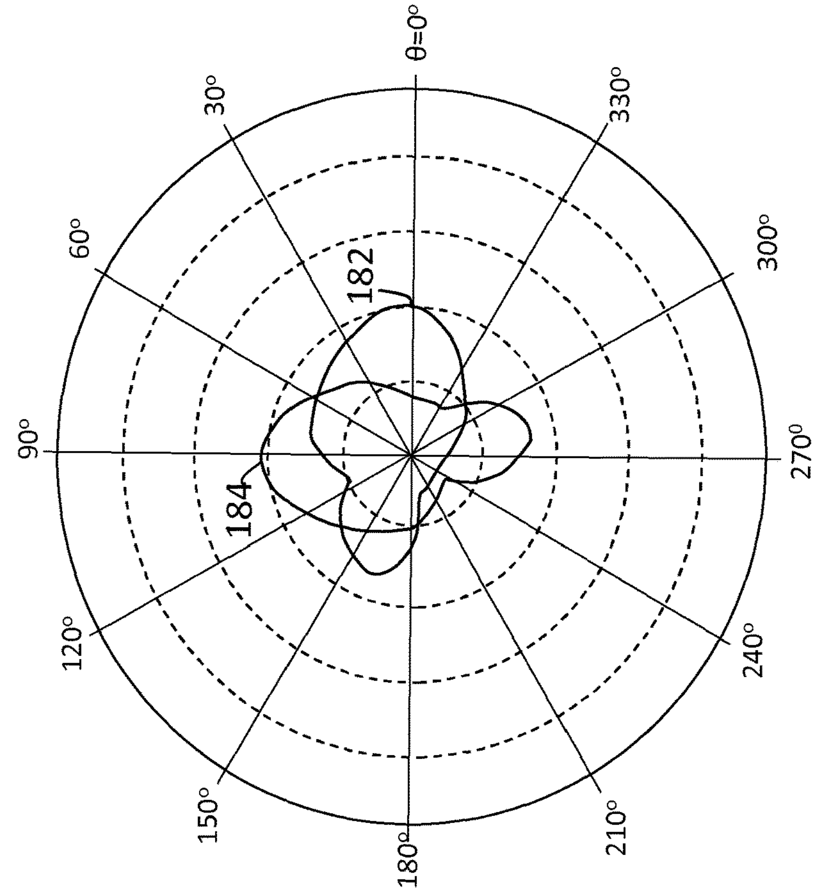
Figure 8:
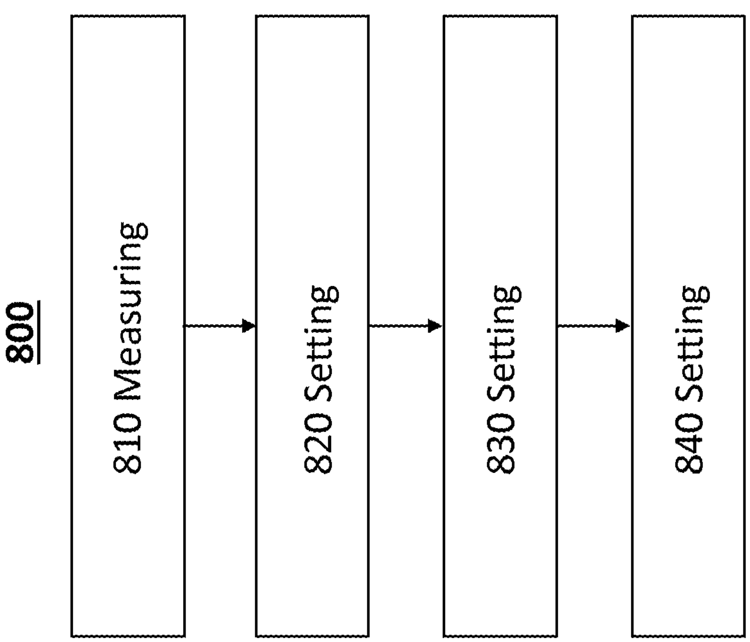
Figure 6:
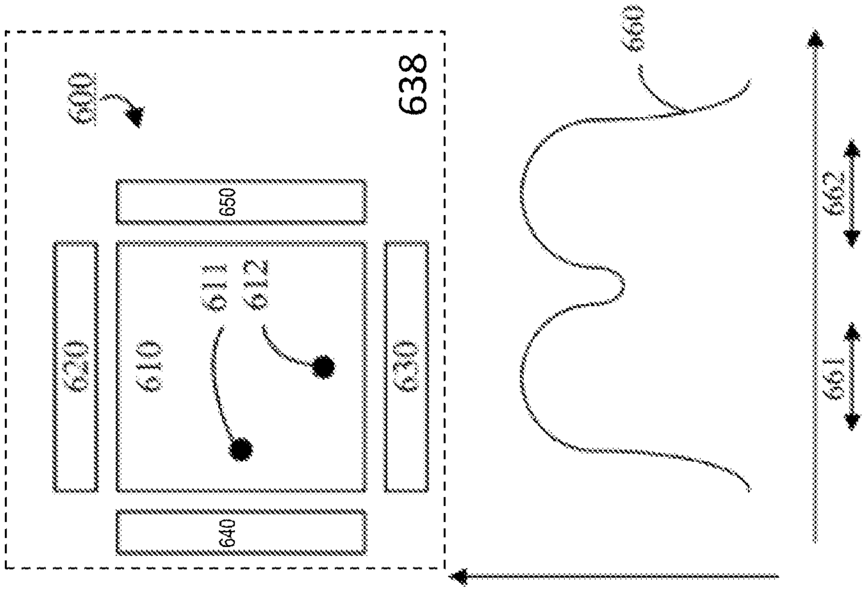
Figure 10:
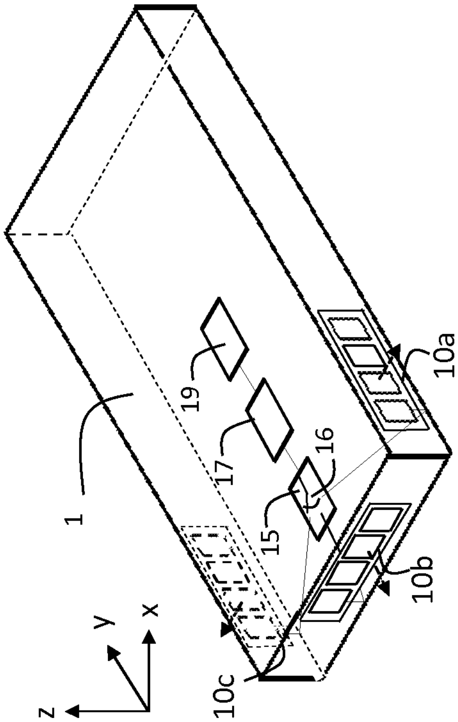
Figure 7:
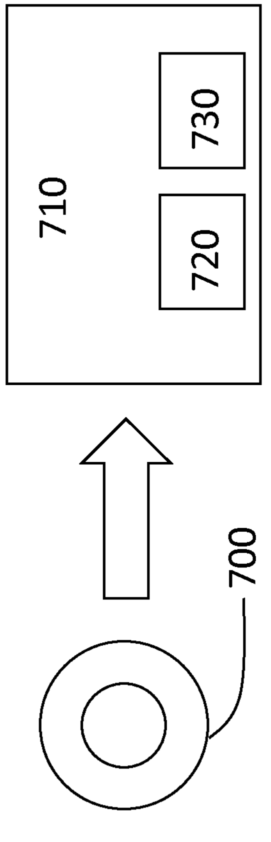
Figure 9:
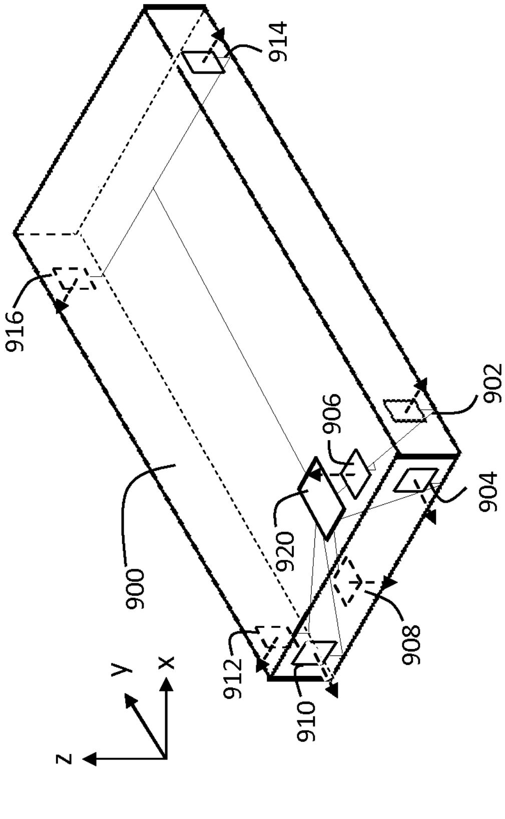

FIG. 5*a* is an antenna radiation plot illustrating the radiation patterns from first and second antennas according to some embodiments;

FIG. 5*b* is an antenna radiation plot illustrating the radiation patterns from first, second and third antennas according to some embodiments;

FIG. 6 is a schematic drawing illustrating antenna structures according to some embodiments;

FIG. 7 is a schematic drawing illustrating a computer readable medium according to some embodiments;

FIG. 8 is a flowchart illustrating method steps implemented in an apparatus according to some embodiments;

FIG. 9 is a schematic drawing illustrating an electronic device according to some embodiments; and FIG. 10 is a schematic drawing illustrating a prior art smartphone.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Terminology

The term "routing" below refers to wire routing, which is a step in the design of printed circuit boards (PCBs) when connecting different integrated circuits (ICs) to each other with wires.

The term "external antenna" below refers to an antenna, which is external to an encapsulation that may comprise a radio/transceiver chip. One example of an external antenna is an antenna, which is external to the electronic device, e.g., the antenna is located on the outside of the electronic device, or the antenna is located on or about a casing of the electronic device. Another example of an external antenna is an antenna, which is located externally to an encapsulation that may comprise a radio/transceiver chip, to which it is connected, but located inside the casing of the electronic device.

The term "baseband signal" below refers to a signal, which has been down converted to a baseband in a radio receiver from one or more signals received by a respective antenna.

The term "orientation" below refers to the orientation, angular position, attitude, or direction of an object, such as an antenna, and describes how the object is placed in the space it occupies.

Below reference is made to a zero-intermediate frequency (zero-IF) signal or connection. An intermediate frequency (IF) is a frequency to which a carrier wave is shifted as an intermediate step in transmission or reception. The intermediate frequency is created by mixing the carrier signal with a local oscillator signal in a process called heterodyning, resulting in a signal at the difference or beat frequency. Intermediate frequencies are used in superheterodyne radio receivers, in which an incoming signal is shifted to an IF for amplification before final detection is done. A zero-IF signal is to be interpreted as a signal that does not need to go through an intermediate step in transmission or reception before being sent to a baseband processor, e.g., a baseband signal. Thus, a zero-IF signal can be utilized by a baseband processor directly.

The polarization of an antenna refers to the orientation of the electric field of the radio wave transmitted by it and is determined by the physical structure of the antenna and its orientation. E.g., an antenna composed of a linear conductor (such as a dipole or whip antenna) oriented vertically will result in vertical polarization; if turned on its side the same antenna's polarization will be horizontal.

Below is referred to x-axis, xy-plane etc. The axes and planes are part of a Cartesian coordinate system.

Below reference is made to signal to noise ratio (SNR). SNR is a measure of the quality of a signal and may be estimated, utilizing well known techniques, from the baseband signal for each respective antenna, utilizing e.g., transmitted pilot or synchronization (sync) symbols, such as reference symbols (RS), primary synchronization signals (PSS) or secondary synchronization signals (SSS), in e.g., 5G-NR.

Figure 1:
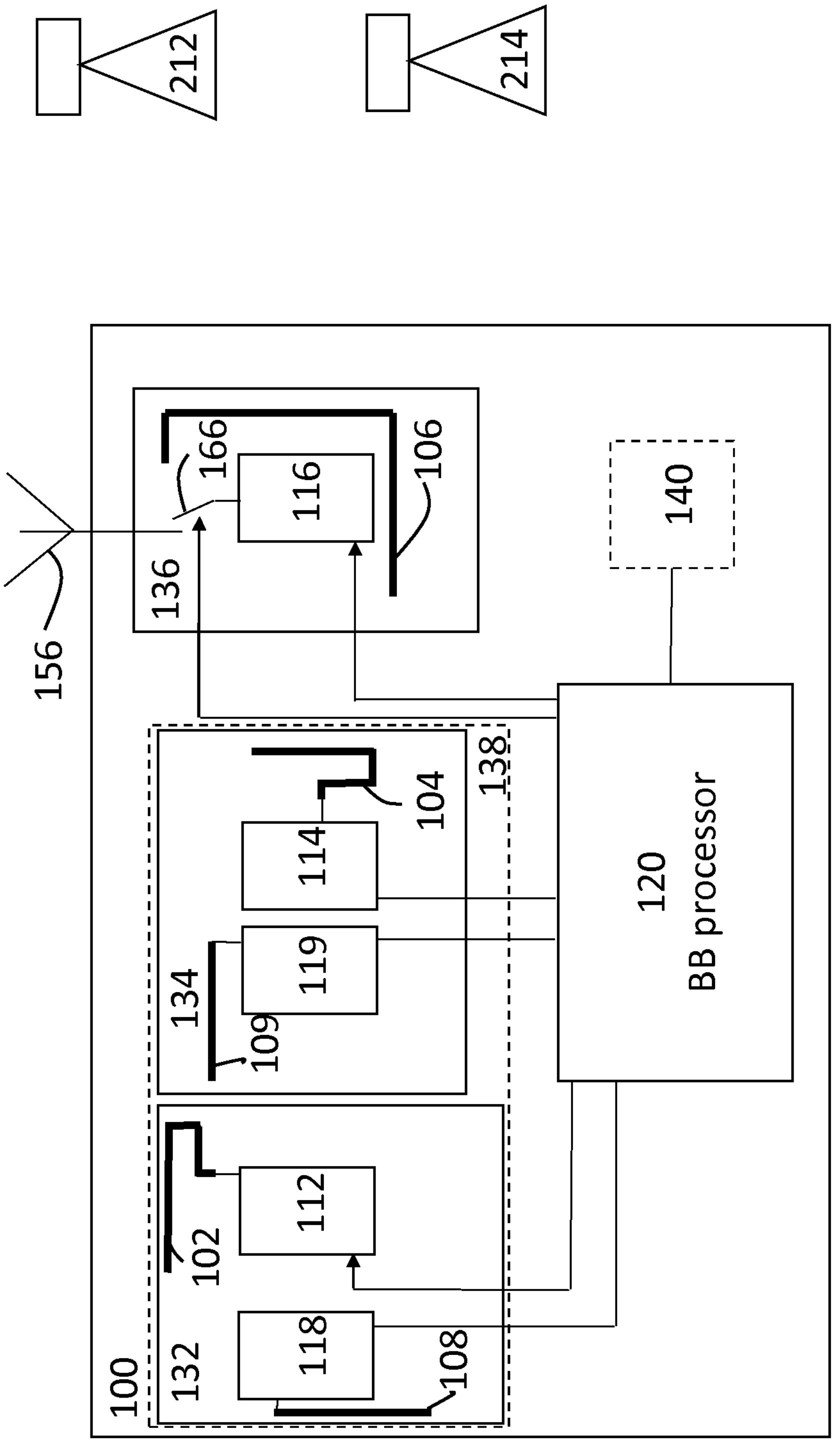
FIG. 1 is a schematic drawing illustrating an electronic device according to some embodiments.

In the following, embodiments will be described where FIG. 1 illustrates an example electronic device 100. The electronic device 100 comprises a first antenna 102 and a second antenna 104. Furthermore, the electronic device 100 comprises first radio frequency, RF, circuitry 112 and second RF circuitry 114. The first RF circuitry 112 is connected to the first antenna 102. The second RF circuitry 114 is connected to the second antenna 104. Each of the first and the second RF circuitry 112, 114 comprises one or more of a Low Noise amplifier, a Mixer, a Local oscillator, a Phase locked loop, an analog filter, a Voltage Gain Amplifier, an analog to digital converter, ADC, a digital filter, a Power Amplifier and a digital to analog converter, DAC. Moreover, the electronic device 100 comprises a baseband processor 120. The baseband processor 120 is connected or connectable via a zero-intermediate frequency, zero-IF, signal (or connection/path) to the first and the second RF circuitries 112, 114. By utilizing a zero-IF signal, routing is facilitated, simplified and/or reduced, e.g., due to the low bandwidth and/or frequency of the zero-IF signal. Furthermore, by utilizing a zero-IF signal the need for an intermediate down-converting step is eliminated. In some embodiments, the baseband processor 120 is connected or connectable via a baseband signal (or connection/path) to the first and the second RF circuitries 112, 114. The first antenna 102 is integrated together with the first RF circuitry 112 in a first encapsulation 132. The second antenna 104 is integrated together with the second RF circuitry 114 in a second encapsulation 134. The second encapsulation 134 is preferably different from the first encapsulation 132. The first and second antennas 102, 104 have different orientations, such as different orientations in space, e.g., the first antenna 102 is an elongated antenna (mainly/only) extending in the direction of an x-axis whereas the second antenna 102 is an elongated antenna (mainly/only) extending in the direction of a y-axis or the first antenna 102 is an elongated antenna (mainly/only) extending along an xy-plane whereas the second antenna 104 is an elongated antenna (mainly/only) extending along an xz-plane. Alternatively, the antenna orientations of the first and second antennas 102, 104 are described by 3D antenna gain information/plots. Thus, if the first antenna 102 has a main antenna gain direction of (radiates mainly towards) 0 degrees, whereas the second antenna 104 has a main antenna gain direction of (radiates mainly towards) 90 degrees, the first and second antennas 102, 104 have different orientations. FIG. 5*a* illustrates the radiation patterns 182, 184 from the first and second antennas 102, 104 according to some embodiments. As can be seen from FIG. 5*a*, the first antenna 102 has a radiation pattern 182 with a main antenna gain direction being (pointing towards) 0 arc degrees (in a plane, such as the XY-plane). Furthermore, the second antenna 104 has a radiation pattern 184 with a main antenna gain direction being (pointing towards) 90 arc degrees (in a plane, such as the XY-plane). Thus, in the example shown in FIG. 5*a*, the orientations of the first and second antennas 102, 104 are separated with at least 90 degrees in at least one of an XY-, YZ- or XZ-plane, i.e., the main antenna gain direction of the first and second antennas 102, 104 are separated with at least 90 degrees in at least one of an XY-, YZ- or XZ-plane. The orientations of the first and second antennas 102, 104 may be different because the first encapsulation 132 has been placed with a different angle than the second encapsulation 134 inside the electronic device 100. Thus, the first antenna 102 may have the same orientation relative the first encapsulation 132 as the second antenna 104 has relative the second encapsulation 134. However, in some embodiments, the first and second antennas 102, 104 have different orientations relative the respective encapsulation 132, 134, while the first and second encapsulations 132, 134 have the same orientation inside the electronic device 100. By placing antennas in different orientations/directions, the antenna radiation around the electronic device becomes more spherical, thus improving performance and/or signal quality/strength (and/or user satisfaction) of the radio communication.

In some embodiments, the second encapsulation 134 is different from the first encapsulation 132 and the first and second encapsulations 132, 134 have different orientations, such as different orientations in space, e.g., the first encapsulation 132 extends (mainly/only) along an xy-plane whereas the second encapsulation 134 extends (mainly/only) along an xz-plane. As an example, the first and second antennas 102, 104 have the same orientation relative the respective encapsulation 132, 134, while the first and second encapsulations 132, 134 have different orientations inside the electronic device 100. In some embodiments, the electronic device further comprises a third antenna 106 and third RF circuitry 116. In some embodiments, the third RF circuitry 116 comprises one or more of a Low Noise amplifier, a Mixer, a Local oscillator, a Phase locked loop, an analog filter, a Voltage Gain Amplifier, an analog to digital converter (ADC), a digital filter, a Power Amplifier and a digital to analog converter (DAC). The baseband processor 120 is connected via a zero-IF signal/connection/path, to the third RF circuitry 116. The third antenna 106 is integrated together with the third RF circuitry 116 in a third encapsulation 136 different from the first and second encapsulations 132, 134. The first, second and third antennas 102, 104, 106 have different orientations, such as different orientations in space. E.g., the first antenna 102 has a first orientation, such as (mainly/only) extending in the direction of an x-axis whereas the second antenna 104 has a second orientation, such as (mainly/only) extending in the direction of a y-axis and the third antenna 106 has a third orientation, such as (mainly/only) extending in the direction of a z-axis. Thus, the antenna radiation around the electronic device becomes more spherical (or the coverage is increased/improved), thus improving performance/quality (and user satisfaction) of the radio communication.

In some embodiments each of the first, second and third RF circuitry 112, 114, 116 is configured or configurable to be in either an operating mode, in which reception or transmission of radio signals is performed via the respective antenna 102, 104, 106, or in a stand-by mode, in which no reception or transmission of radio signals is performed. The baseband processor 120 or another processing unit is configured to set each of the first, second and third RF circuitry 112, 114, 116 in either the operating mode or the stand-by mode based on radio signal strength and/or signal to noise ratio, SNR measurements. E.g., the first and third antennas 102, 106 may have the same orientation, whereas the second antenna 104 has an orientation, which is different from the orientation of the first and third antennas 102, 106. Then, based on an indication that the measured radio signal strength and/or the signal to noise ratio, SNR is higher for the first antenna 102 than for the third antenna 106 the baseband processor 120 may set the first RF circuitry 112 in the operating mode and the third RF circuitry 116 in the stand-by mode. The second RF circuitry 114 may be set to the stand-by mode. By setting some of the RF circuitries (e.g., the ones that do not contribute with significant signal energy) in the stand-by mode, power consumption may be reduced e.g., while SNR is maintained at the same (high) level. Furthermore, by utilizing the antenna with the higher radio signal strength and/or SNR, the negative impact of blocking of signals, e.g., by a hand, may be prevented or mitigated. In some embodiments, the baseband processor 120 is configured to set each of the first, second and third RF circuitry 112, 114, 116 in either the operating mode or the stand-by mode based on information from one or more sensors 140 (in addition or as an alternative to being based on radio signal strength and/or SNR measurements). The one or more sensors 140 may be one or more cameras, such as one or more digital cameras, one or more fingerprint sensors, and/or one or more touch sensitive sensors. The sensor(s) may give information about how the electronic device 100 is held, i.e., where a hand is located in relation to the electronic device 100. The camera, fingerprint sensor or touch sensor may locate finger placement on the electronic device 100. In addition, the one or more sensors 140 may be complemented with further sensors, such as one or more GPS, accelerometer, and gyroscope, which further sensors may give more information about which antennas are be blocked and which antennas are not blocked. Thus, the negative impact of blocking of signals, e.g., by a hand, may be prevented or mitigated.

In some embodiments, the electronic device 100 further comprises a fourth and a fifth antenna 108, 109. Furthermore, the electronic device 100 comprises fourth RF circuitry and fifth RF circuitry 118, 119. The fourth RF circuitry 118 is connected to the fourth antenna 108. The fifth RF circuitry 119 is connected to the fifth antenna 109. Each of the fourth and the fifth RF circuitry 118, 119 comprises one or more of a Low Noise amplifier, a Mixer, a Local oscillator, a Phase locked loop, an analog filter, a Voltage Gain Amplifier, an ADC, a digital filter, a Power Amplifier, and a DAC. The fourth antenna 108 is integrated together with the fourth RF circuitry 118 in the first encapsulation 132. The fifth antenna 109 is integrated together with the fifth RF circuitry 119 in the second encapsulation 134. In some embodiments, the first and second antennas 102, 104 have vertical polarization and the fourth and fifth antennas 108, 109 have horizontal polarization. Alternatively, the first and fifth antennas 102, 109 have vertical polarization and the second and fourth antennas 104, 108 have horizontal polarization. In some embodiments, the first and second encapsulations 132, 134 is one single encapsulation 138. In these embodiments, the first and second antennas 102, 104 may be integrated antennas with vertical polarization, and the fourth and fifth antennas 108, 109 may be integrated antennas with horizontal polarization. Thus, in some embodiments, the single encapsulation 138 comprises/encapsulates a first antenna 102 being an integrated antenna with vertical polarization, a second antenna 104 being an integrated antenna with vertical polarization, a fourth antenna 108 being an integrated antenna with horizontal polarization, a fifth antenna 109 being an integrated antenna with horizontal polarization, first RF circuitry 112, second RF circuitry 114, fourth RF circuitry 118 and fifth RF circuitry 119. In some embodiments, a plurality of antennas (such as 2, 4, 8, 16 or 32 antennas), each antenna having a different orientation, and a plurality of RF circuitries (such as 2, 4, 8, 16 or 32 RF circuitries, each connected to a respective antenna) are comprised/encapsulated in the single encapsulation 138. In these embodiments, the single encapsulation may be a digital beamforming panel. This may be advantageous as it may then be possible to integrate all antennas in all different directions needed for an electronic device, such as the electronic device 100, in a single encapsulation. Thus, less (physical) space is needed for components in the electronic device, thereby facilitating placement of components in the electronic device and/or enabling the use of (small) Internet of things (IoT) devices and/or reducing the size of the electronic device, such as an IoT device.

In some embodiments all the RF circuitries 112, 114, 116, 118, 119 which are set to the operating mode communicates, via a respective antenna 102, 104, 106, 108, 109, with a first network, NW, node 212, i.e., with the same NW node. Alternatively, the first RF circuitry 112 (always) communicates (via the first antenna 102) with the first NW node 212 when in the operating mode and the second RF circuitry 114 (always) communicates (via the second antenna 104) with a second NW node 214 when in the operating mode. The third, fourth and fifth RF circuitries 116, 118, 119 may then, when in the operating mode communicate (via a respective antenna 106, 108, 109) with the first and/or the second NW node 212, 214. As an example, the third, fourth and fifth RF circuitries 116, 118, 119 communicates (via a respective antenna 106, 108, 109), when in the operating mode, with the first NW node 212. As another example, the third, fourth and fifth RF circuitries 116, 118, 119 communicates (via a respective antenna 106, 108, 109), when in the operating mode, with the second NW node 214. As yet another example, the third and fifth RF circuitries 116, 119 communicates (via a respective antenna 106, 109), when in the operating mode, with the first NW node 212, whereas the fourth RF circuitry 118 communicates (via a respective antenna 108), when in the operating mode, with the second NW node 214.

In some embodiments, the first, second and third antennas 102, 104, 106 have different orientations, i.e., the first antenna 102 has a first orientation, the second antenna 104 has a second orientation, the third antenna 106 has a third orientation, and the first orientation is different from the second and third orientations and the third orientation is different from the second orientation. The orientations of the first, second and third antennas 102, 104, 106 may be separated with at least 90 degrees in at least one of an XY-, YZ- or XZ-plane, i.e., the main antenna gain direction of the first, second and third antennas 102, 104, 106 may be separated with at least 90 degrees in at least one of an XY-, YZ- or XZ-plane. FIG. 5*b* illustrates the radiation patterns 192, 194, 196 from the first, second and third antennas 102, 104, 106 according to some embodiments. As can be seen from FIG. 5*b*, the first antenna 102 has a radiation pattern 192 with a main antenna gain direction being (pointing towards) 0 arc degrees (in a plane, such as the XY-plane). Furthermore, the second antenna 104 has a radiation pattern 194 with a main antenna gain direction being (pointing towards) 120 arc degrees (in a plane, such as the XY-plane). Moreover, the third antenna 106 has a radiation pattern 196 with a main antenna gain direction being (pointing towards) 240 arc degrees (in a plane, such as the XY-plane). Thus, in the example shown in FIG. 5*b*, the orientations of the first, second and third antennas 102, 104, 106 are separated with at least 90 degrees in at least one of an XY-, YZ- or XZ-plane, i.e., the main antenna gain direction of the first, second and third antennas 102, 104, 106 are separated with at least 90 degrees in at least one of an XY-, YZ- or XZ-plane. By separating the orientations of the first, second and third antennas 102, 104, 106 with at least 90 arc degrees, such as 120 arc degrees in at least one of an XY-, YZ- or XZ-plane, the antenna radiation around the electronic device becomes more spherical (or the coverage is increased/improved), thus improving performance/quality (and user satisfaction) of the radio communication.

Figure 2:
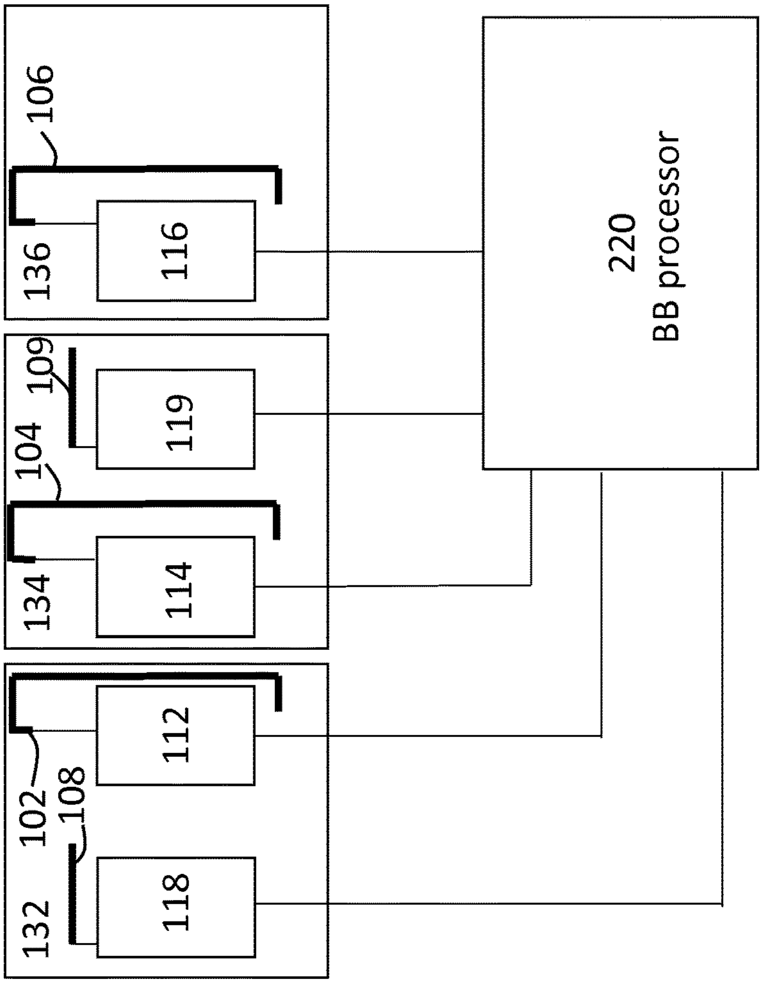
FIG. 2 is a schematic drawing illustrating an arrangement with a baseband processor according to some embodiments.

FIG. 2 illustrates an example baseband processor 220. The baseband processor 220 is connectable or connected to first, second and third RF circuitries 112, 114, 116 via a zero-intermediate frequency, zero-IF signal. The baseband processor 220 is configured to set each of the first, second and third RF circuitry 112, 114, 116 in either an operating mode, in which reception and/or transmission of radio signals is performed via an antenna 102, 104, 106 connected to the respective RF circuitry 112, 114, 116, or a stand-by mode, in which no reception or transmission of radio signals is performed, based on radio signal strength and/or signal to noise ratio, SNR measurements. In some embodiments, the baseband processor 220 is further connectable or connected to fourth and fifth RF circuitries 118, 119 via a zero-intermediate frequency, zero-IF signal. The baseband processor 220 is, in these embodiments, further configured to set each of the fourth and fifth RF circuitry 118, 119 in either the operating mode, in which reception and/or transmission of radio signals is performed via a respective antenna 108, 109, or the stand-by mode, based on radio signal strength and/or signal to noise ratio, SNR measurements. In some embodiments, the baseband processor 220 is utilized as the baseband processor 120. In some embodiments, the baseband processor 120 is utilized as the baseband processor 220.

Figure 3:
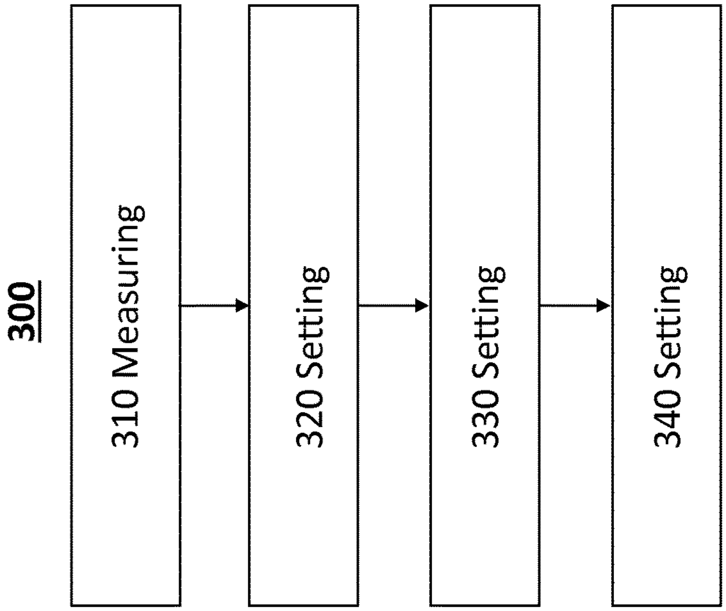
FIG. 3 is a flowchart illustrating method steps according to some embodiments.

FIG. 3 is a flowchart illustrating method steps of a method 300 for an electronic device 100. The method 300 comprises measuring 310 a radio signal strength and/or a signal to noise ratio (SNR) for each of a first, second and third antenna 102, 104, 106. Furthermore, the method 300 comprises setting 320, by a baseband processor 120, a first RF circuitry 112 in either an operating mode, in which reception and/or transmission of radio signals is performed via a first antenna 102 connected to the first RF circuitry 112, or a stand-by mode, in which no reception or transmission of radio signals is performed, based on the measured received radio signal strength and/or SNR for each of a first, second and third antenna 102, 104, 106. Moreover, the method 300 comprises setting 330, by a baseband processor 120, a second RF circuitry 114 in either an operating mode, in which reception and/or transmission of radio signals is performed via a second antenna 104 connected to the second RF circuitry 114, or a stand-by mode, in which no reception or transmission of radio signals is performed, based on the measured received radio signal strength and/or the measured SNR for each of the first, second and third antenna 102, 104, 106. The method 300 comprises setting 340, by a baseband processor 120, a third RF circuitry 116 in either an operating mode, in which reception and/or transmission of radio signals is performed via a third antenna 106 connected to the third RF circuitry 116, or a stand-by mode, in which no reception or transmission of radio signals is performed, based on the measured received radio signal strength and/or the measured SNR for each of the first, second and third antenna 102, 104, 106.

Figure 4:
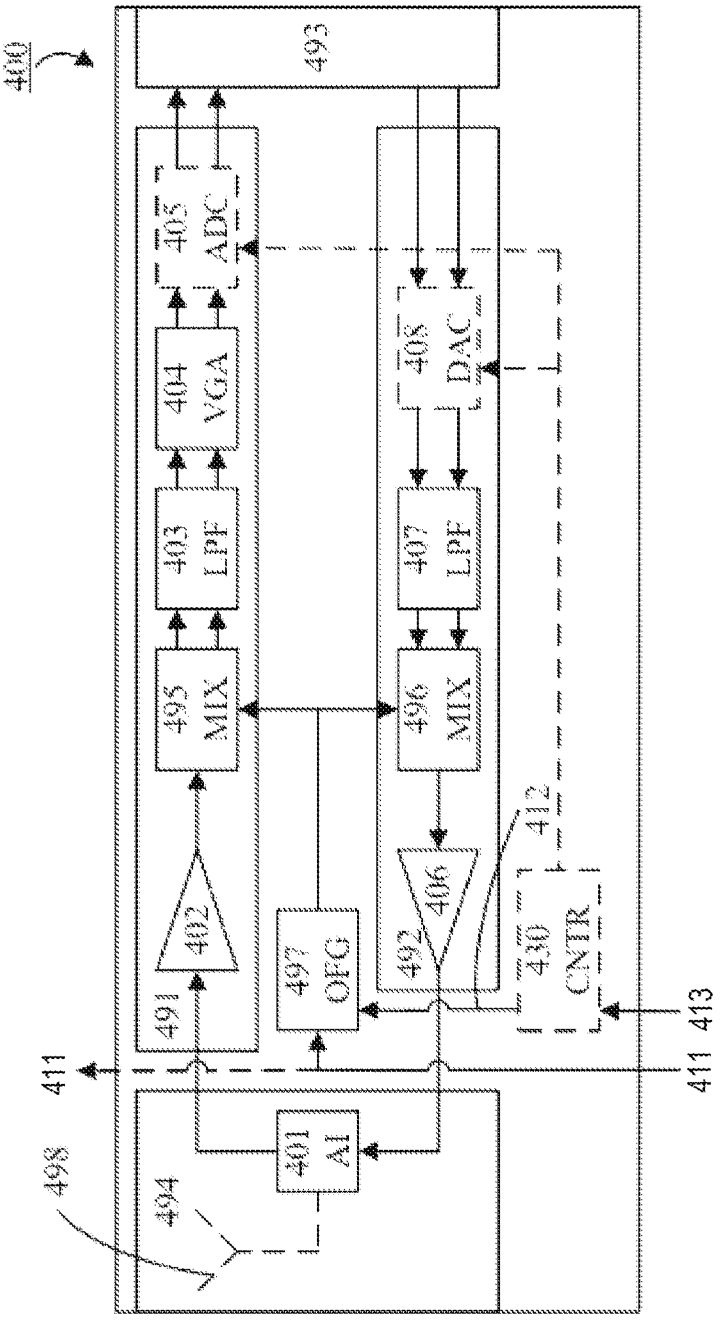
FIG. 4 is a schematic drawing illustrating a transceiver chip for a multi-antenna transceiver system according to some embodiments.

FIG. 4 schematically illustrates an example transceiver chip 400 for a multi-antenna transceiver system according to some embodiments. For example, the transceiver chip 400 may be used as any one of the first, second, third, fourth and fifth RF circuitries 112, 114, 116, 118, 119 of FIG. 1. The transceiver chip 400 comprises a front end 494, an interface 493, a receiver path 491 and a transmitter path 492. The receiver path 491 comprises a low-noise amplifier 402, a down-converter in the form of a mixer (MIX) 495, a low-pass filter (LPF) 403, a variable gain amplifier (VGA) 404, and possibly an analog-to-digital converter (ADC) instance 405. The transmitter path 492 comprises a low-pass filter (LPF) 407, an up-converter in the form of a mixer (MIX) 496, a power amplifier 406, and possibly a digital-to-analog converter (DAC) instance 408. The interface 493 is for connection to baseband processing circuitry, such as the baseband processor 120, 220, and can have any suitable functional and/or physical components. The interface 493 is a digital interface when an ADC instance 405 and a DAC instance 408 are comprised on the transceiver chip, and the interface 493 is an analog interface when the transceiver chip does not comprise any ADC or DAC (ADC/DAC may be implemented in separate circuitry or in the baseband processing circuitry). As illustrated by the dashed schematic antenna element 498 in FIG. 4, the front-end 494 may be for connection to one or more external antenna elements (e.g., via an antenna port of the transceiver chip), such as a sixth antenna 156 and/or may comprise one or more on-chip (integrated) antenna elements, such as the first, second, third, fourth or fifth antenna 102, 104, 106, 108, 109. Thus, the transceiver chip 400 is associated with one or more corresponding antenna elements. The antenna element may, for example, comprise a broadband antenna tuned to transmit and receive signals in an applicable collection of frequency ranges. Furthermore, the front-end 494 may comprise any suitable functional and/or physical components. For example, the front end 494 may comprise an antenna isolator (AI; e.g., duplexer or diplexer circuitry, antenna switch circuitry, or any suitable combination thereof) 401, for separation of received signals from signals to be transmitted. The antenna isolation arrangement may, for example, comprise an isolation device adapted to isolate transmitter and receiver for each other in an applicable collection of frequency ranges. Generally, a duplexer or diplexer may be implemented with Surface-Acoustic Wave (SAW) technology, Bulk-Acoustic Wave (BAW) technology, with waveguide technology, with lumped RLC elements (on-chip and/or discrete components), and/or with transmission-lines. The down-converter mixer 495 and up-converter mixer 496 of the transceiver chip 400 each receives a conversion frequency (for on-chip frequency conversion of a transceiver signal) from an on-chip (or otherwise chip-associated) frequency generator (OFG) 497. As explained above, the on-chip frequency generator 497 is configured to provide the conversion frequency based on a control signal 412 indicative of a dynamic setting for the conversion frequency and possibly based on a reference frequency 411 provided to the transceiver chip 400. Put more generally, the chip-associated frequency generator is configured to provide the conversion frequency based on the control signal 412 and possibly based on a reference frequency provided to the chip-associated frequency generator for the transceiver chip 400. The control signal 412 may be provided by a controller external to the transceiver chip 400 (e.g., a common controller for all the transceiver chips, such as the baseband processor 120, 220) or by an on-chip, or chip-associated, controller (CNTR) 430 (e.g., a controller for only that transceiver chip). A chip-associated controller 430 may, in turn, be instructed (e.g., by the baseband processor 120, 220) via an input signal 413. When an ADC instance 405 and a DAC instance 408 are comprised on the transceiver chip, the controller (whether chip-associated or not) may be further adapted to cause configuration of the on-chip ADC and/or the on-chip DAC for dynamically setting a sampling rate of the on-chip ADC and/or DAC based on a bandwidth associated with the respective conversion frequency (e.g., the signal bandwidth). For example, a relatively large bandwidth may require relatively high sampling rate, and vice versa. The transceiver chip 400 may comprise a reference frequency output (in addition to a reference frequency input) for providing the reference frequency 411 to one or more further transceiver chips. Put more generally, a package comprising a transceiver chip and a chip-associated frequency generator may comprise a reference frequency input and a reference frequency output, the latter for providing the reference frequency to one or more further transceiver chip packages.

FIG. 6 schematically illustrates example antenna structures according to some embodiments. The antenna structures of FIG. 6 may, for example, be used to implement a broadband on-chip antenna element comprised in, integrated with, or otherwise connected to a transceiver chip according to some embodiments, e.g., the transceiver chips described in connection with FIG. 4. As shown in FIG. 6, an example dual patch antenna 600 comprises a ground plane with a diversity patch 610 tuned for a first transmission/reception frequency (or first transmission/reception frequency range) which may be used by the transceiver chip. Typically, the ground plane with a diversity patch is tuned for the higher transmission/reception frequency (or transmission/reception frequency range) when two different conversion frequencies may be used by the transceiver chip. For example, the ground plane with a diversity patch 610 may be tuned for 39 GHz. Antenna ports 611 and 612, enable respective polarization operation; a first polarization (e.g., horizontal) is enabled by 611 and a second polarization (e.g., vertical) is enabled by 612. Additional patches 620, 630, 640, 650 may extend the frequency interval covered by the antenna 600, e.g., to a second transmission/reception frequency (or second transmission/reception frequency range) which may be used by the transceiver chip. Typically, the additional patches 620, 630, 640, 650 extend the frequency interval covered by the antenna to the lower transmission/reception frequency (or transmission/reception frequency range) when two different transmission/reception frequencies may be used by the transceiver chip. For example, the additional patches 620, 630, 640, 650 may extend the frequency interval covered by the antenna from 39 GHz down to 28 GHz. In the example of FIG. 6, the additional patches 620, 630 extend the frequency interval for the first polarization and the additional patches 640, 650 extend the frequency interval for the second polarization.

In some embodiments, the first antenna 102 comprises the patches 610, 620, 630 and the fourth antenna 108 comprises the patches 610, 640, 650. Thus, the common antenna structure comprises the first and fourth antennas 102, 108, i.e., the first and fourth antennas 102, 108 together form the antenna structure, e.g., the dual patch antenna 600. Furthermore, in some embodiments the second and fifth antennas 104, 109 form a common antenna structure in the same or a similar manner as described above for the first and fourth antennas 102, 108.

Moreover, in some embodiments an encapsulation 638 encapsulates the patches 610, 620, 630, 640, 650. Thus, the first and fourth antennas 102, 104 are comprised in one single encapsulation 638. In some embodiments, the single encapsulation 638 comprises/encapsulates a first antenna 102 being an integrated antenna with horizontal polarization (comprising patches 610, 620, 630), a fourth antenna 108 being an integrated antenna with vertical polarization (comprising patches 610, 640, 650), first RF circuitry 112, fourth RF circuitry 114, and optionally second and third antennas 104, 106 and second and third RF circuitry 114, 116. In some embodiments, the single encapsulation 638 is utilized as the single encapsulation 138.

A rudimentary plot of antenna gain versus frequency is also presented in FIG. 6, showing an example antenna gain 660 of the dual patch antenna 600 with high antenna gain in a first frequency range 662 (e.g., comprising 39 GHz) and a second frequency range 661 (e.g., comprising 28 GHZ). Thus, the broadband antenna element 600 is a dual band patch antenna, that is designed such that two resonance peaks are achieved at respective transmission/reception frequencies. Generally, the antenna element(s) of a transceiver chip may be implemented using any suitable approach (e.g., dipole antenna(s), vertical antenna(s), patch antenna(s), or any combination thereof). In some embodiments, the antenna element(s) of a transceiver chip comprise two (or more) antenna elements; one for each frequency range. Generally, a transmission/reception frequency may correspond to a respective conversion frequency (e.g., the respective conversion frequency may be equal to the transmission/reception frequency for conversion to baseband, and the respective conversion frequency may be lower than—but depending on—the transmission/reception frequency for conversion to intermediate frequency).

According to some embodiments, a computer program product comprises a non-transitory computer readable medium 700 such as, for example a universal serial bus (USB) memory, a plug-in card, an embedded drive, a digital versatile disc (DVD) or a read only memory (ROM). FIG. 7 illustrates an example computer readable medium in the form of a compact disc (CD) ROM 700. The computer readable medium has stored thereon, a computer program comprising program instructions. The computer program is loadable into a data processor (PROC) 720, which may, for example, be comprised in a computer or a computing device 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, the method illustrated in FIG. 3, which is described herein.

FIG. 8 illustrates example method steps implemented in an apparatus 800. The apparatus 800 comprises controlling circuitry. The controlling circuitry may be one or more processors, such as a baseband processor 120, 220. The controlling circuitry is configured to cause measurement 810 of a radio signal strength and/or a signal to noise ratio (SNR) for each of a first, second and third antenna 102, 104, 106. To this end, the controlling circuitry may be associated with (e.g., operatively connectable, or connected, to) a measurement/control unit (e.g., measurement circuitry or a measurer). The measurement/control unit may be the BB processor 120. Furthermore, the controlling circuitry is configured to cause setting 820 of a first RF circuitry 112 in either an operating mode, in which reception and/or transmission of radio signals is performed, via a first antenna 102 connected to the first RF circuitry 112, or a stand-by mode, in which no reception or transmission of radio signals is performed, based on the measured received radio signal strength and/or the measured signal to noise ratio (SNR) for each of a first, second and third antenna 102, 104, 106. To this end, the controlling circuitry may be associated with (e.g., operatively connectable, or connected, to) a first setting unit (e.g., first setting circuitry or a first setter). The first setting unit may be the BB processor 120. Moreover, the controlling circuitry is configured to cause setting 830 of a second RF circuitry 114 in either an operating mode, in which reception and/or transmission of radio signals is performed via a second antenna 104 connected to the second RF circuitry 114, or a stand-by mode, in which no reception or transmission of radio signals is performed, based on the measured received radio signal strength and/or the measured SNR for each of a first, second and third antenna 102, 104, 106. To this end, the controlling circuitry may be associated with (e.g., operatively connectable, or connected, to) a second setting unit (e.g., second setting circuitry or a second setter). The second setting unit may be the BB processor 120. The controlling circuitry is configured to cause setting 840 of a third RF circuitry 116 in either an operating mode, in which reception and/or transmission of radio signals is performed via a third antenna 106 connected to the third RF circuitry 116, or a stand-by mode, in which no reception or transmission of radio signals is performed, based on the measured received radio signal strength and/or the measured SNR for each of a first, second and third antenna 102, 104, 106. To this end, the controlling circuitry may be associated with (e.g., operatively connectable, or connected, to) a third setting unit (e.g., third setting circuitry or a third setter). The third setting unit may be the BB processor 120.

FIG. 9 illustrates an example electronic device 900. The electronic device 900 have a distributed digital beamforming architecture, such as distributed digital beamforming architecture for mmW communication, where the antennas with respective transceiver circuitry 902, 904, 906, 908, 910, 912, 914, 916 are distributed around the electronic device 900. Each antenna is integrated together with a corresponding transceiver circuitry 902, 904, 906, 908, 910, 912, 914, 916. Each transceiver circuitry 902, 904, 906, 908, 910, 912, 914, 916 is connected to a baseband (BB) processor 920. The antenna orientation, e.g., the main direction of the antenna gain (indicated by dashed arrows in the figure) is also distributed such that there are antennas that can capture the radio signal from all directions. The BB processor 920 controls which subset of the antennas with respective transceiver circuitry 902, 904, 906, 908, 910, 912, 914, 916 that should be enabled (and thus transmitting and/or receiving). For instance, the BB processor 920 may configure the antennas with respective transceiver circuitry 902, 904, 910, 914 to be enabled, and thus transmitting and/or receiving radio signals from remote NW nodes (e.g., NW nodes 212, 214 shown in FIG. 1), while configuring the antennas with respective transceiver circuitry 906, 908, 912, 916 to be in standby mode/disabled. The reason for disabling some of the antennas is that their antenna gain may not be sufficiently large for receiving radio signals from a NW node, e.g., due to the fact that these antennas have an orientation which is not good for reception from or transmission to the particular NW node. Which antennas to be enabled and disabled may by based on signal strength measurements at time periods when a NW node sends synchronization signals for the purpose of finding the best beam direction. In another embodiment, the BB processor 920 may configure antennas with respective transceiver circuitry 902, 904, 906 and 910 to be enabled, while the antenna with the respective transceiver circuitry 914 is disabled. In this case the antenna with the respective transceiver circuitry 914 may be disabled even if the antenna (with respective transceiver circuitry) 914 points in the same direction as the antenna (with respective transceiver circuitry) 902. However, the antenna (with respective transceiver circuitry) 914 may be blocked by a hand. The BB processor 920 may detect blocked antennas by signal strength measurements and/or by using sensors detecting that a hand may blocking certain antennas, as discussed above in connection with FIG. 1. Examples of such sensors may be camera, fingerprint, or some touch sensitive sensor for instance. Thus, the negative impact of blocking of signals, e.g., by a hand, is prevented or mitigated. The electronic device 900 may be identical to the electronic device 100. The BB processor 920 may be utilized as the BB processor 120.

In some embodiments all the RF circuitries 112, 114, 116, 118, 119 which are set to the operating mode communicates, via a respective antenna 102, 104, 106, 108, 109, with a first network, NW, node 212, i.e., with the same NW node. Alternatively, the first RF circuitry 112 (or a first subset of RF circuitries 112) communicates (via the first antenna 102 or via respective antennas) with the first NW node 212 when in the operating mode and the second RF circuitry 114 (or a first subset of RF circuitries 114) communicates (via the second antenna 104 or via respective antennas) with a second NW node 214 when in the operating mode. The third, fourth and fifth RF circuitries 116, 118, 119 (or a third subset of RF circuitries 116, 118, 119) may then, when in the operating mode communicate (via a respective antenna 106, 108, 109) with the first and/or the second NW node 212, 214, such as with both the first and the second NW node 212, 214. Thus, the first and second subset may be disjunct, while a third subset of RF circuitry communicate with first and second remote NW nodes 212, 214. This is solved by precoding, e.g., beamforming, the transmitted signal so that two beams, one in the direction of the first NW node 212 and one in the direction of the second remote NW node 214 are formed. By utilizing beamforming in this way, power consumption may be reduced (e.g., due to a more accurate beamforming). Furthermore, better performance-power consumption trade off may be achieved, e.g., by allocating/controlling RF circuitries to direct beams to one or two base stations depending on e.g., the orientation of the electronic device/smartphone and/or the detected finger placement.

The above-described transceiver architecture is preferably used, but not limited to, in radio transceiver architectures where encapsulated transceiver chips with first and second antennas are distributed over the electronic device operating using Massive-MIMO and/or digital beamforming techniques at mmW frequencies (from 25 GHz up to, but not limited to 300 GHz).

LIST OF EXAMPLES

1. An electronic device (100) comprising:

a first antenna (102) and a second antenna (104);

first radio frequency, RF, circuitry (112) and second RF circuitry (114), the first RF circuitry (112) being connected to the first antenna (102) and the second RF circuitry (114) being connected to the second antenna (104) and each of the first and the second RF circuitry (112, 114) comprising one or more of a Low Noise amplifier, a Mixer, a Local oscillator, a Phase locked loop, an analog filter, a Voltage Gain Amplifier, an analog to digital converter, ADC, a digital filter, a Power Amplifier and a digital to analog converter, DAC; and a baseband processor (120), connected or connectable via a zero-intermediate frequency, zero-IF, signal to the first and the second RF circuitries; and wherein the first antenna (102) is integrated together with the first RF circuitry (112) in a first encapsulation (132), the second antenna (104) is integrated together with the second RF circuitry (114) in a second encapsulation (134), the second encapsulation (134) preferably being different from the first encapsulation (132), and wherein the first and second antennas (102, 104) have different orientations.

2. The electronic device of example 1, wherein the second encapsulation (134) is different from the first encapsulation (132), and wherein the first and second encapsulations (132, 134) have different orientations.

3. The electronic device of any of examples 1-2, further comprising a third antenna (106) and third RF circuitry (116), and wherein the baseband processor (120) is connected via a zero-IF signal, to the third RF circuitry (116) and wherein the third antenna (106) is integrated together with the third RF circuitry (116) in a third encapsulation (136) different from the first and second encapsulations (132, 134) and wherein the first, second and third antennas (102, 104, 106) have different orientations.

4. The electronic device of example 3, wherein each of the first, second and third RF circuitry (112, 114, 116) is configurable to be in either an operating mode, in which reception or transmission of radio signals is performed via the respective antenna (102, 104, 106), or in a stand-by mode, in which no reception or transmission is performed.

5. The electronic device of example 4, wherein the baseband processor (120) is configured to set each of the first, second and third RF circuitry (112, 114, 116) in either the operating mode or the stand-by mode based on radio signal strength and/or signal to noise ratio, SNR, measurements.

6. The electronic device of any of examples 4-5, wherein the baseband processor (120) is configured to set each of the first, second and third RF circuitry (112, 114, 116) in either the operating mode or the stand-by mode based on information from one or more sensors (140), such as a camera, a fingerprint sensor or a touch sensitive sensor.

7. The electronic device of any of examples 1-6, further comprising:

a fourth and a fifth antenna (108, 109);

fourth RF circuitry and fifth RF circuitry (118, 119), the fourth RF circuitry (118) being connected to the fourth antenna (108) and the fifth RF circuitry (119) being connected to the fifth antenna (109) and each of the fourth and the fifth RF circuitry (118, 119) comprising one or more of a Low Noise amplifier, a Mixer, a Local oscillator, a Phase locked loop, an analog filter, a Voltage Gain Amplifier, an ADC, a digital filter, a Power Amplifier and a DAC; and wherein the fourth antenna (108) is integrated together with the fourth RF circuitry (118) in the first encapsulation (132), wherein the fifth antenna (109) is integrated together with the fifth RF circuitry (119) in the second encapsulation (134), and wherein the first and second antennas (102, 104) have vertical polarization and the fourth and fifth antennas (108, 109) have horizontal polarization.

8. The electronic device of any of examples 1-7, wherein all of the RF circuitries (112, 114, 116, 118, 119) being set to the operating mode communicates with a first network, NW, node (212) or wherein the first RF circuitry (112) communicates with the first NW node (212) when in the operating mode and the second RF circuitry (114) communicates with a second NW node (214) when in the operating mode.

9. The electronic device of any of examples 3-8, wherein the first, second and third antennas (102, 104, 106) have different orientations and wherein the orientations of the first, second and third antennas (102, 104, 106) are separated with at least 90 degrees in at least one of an XY-, YZ- or XZ-plane.

10. A baseband processor (120) connectable to first, second and third RF circuitries (112, 114, 116) via a zero-intermediate frequency, zero-IF signal, the baseband processor (120) being configured to set each of the first, second and third RF circuitry (112, 114, 116) in either an operating mode, in which reception and/or transmission of radio signals is performed via an antenna (102, 104, 106) connected to the respective RF circuitry (112, 114, 116), or a stand-by mode, in which no reception or transmission is performed, based on radio signal strength and/or signal to noise ratio, SNR, measurements.

Generally, all terms used herein are to be interpreted according to their ordinary meaning in the relevant technical field, unless a different meaning is clearly given and/or is implied from the context in which it is used. Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step. In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer e.g., a single) unit. Any feature of any of the embodiments/aspects disclosed herein may be applied to any other embodiment/aspect, wherever suitable. Likewise, any advantage of any of the embodiments may apply to any other embodiments, and vice versa. Hence, it should be understood that the details of the described embodiments are merely examples brought forward for illustrative purposes, and that all variations that fall within the scope of the claims are intended to be embraced therein.

The invention claimed is:

1. An electronic device comprising:

a first antenna, a second antenna, and a third antenna;

first radio frequency (RF), circuitry, second RF circuitry and third RF circuitry, the first RF circuitry being connected to the first antenna, the second RF circuitry being connected to the second antenna, the third RF circuitry being connected to the third antenna and each of the first and the second RF circuitry comprising one or more of a Low Noise amplifier, a Mixer, a Local oscillator, a Phase locked loop, an analog filter, a Voltage Gain Amplifier, an analog to digital converter (ADC), a digital filter, a Power Amplifier and a digital to analog converter (DAC); and a baseband processor, connected or connectable via a zero-intermediate frequency (zero-IF) signal to the first, second and third RF circuitries; and wherein the first antenna is integrated together with the first RF circuitry in a first encapsulation, wherein the second antenna is integrated together with the second RF circuitry in a second encapsulation, the second encapsulation being different from the first encapsulation, wherein the third antenna is integrated together with the third RF circuitry in a third encapsulation different from the first and second encapsulations, wherein the first and second antennas have different orientations, wherein each of the first, second and third RF circuitry is configurable to be in either an operating mode, in which reception or transmission of radio signals is performed via the respective antenna, or in a stand-by mode, in which no reception or transmission of radio signals is performed, and wherein the baseband processor is configured to set one or more of the first, second and third RF circuitry in the operating mode based on radio signal strength measurements and based on information from one or more of a camera, a fingerprint sensor and a touch sensitive sensor, and set all other of the first, second and third RF circuitry in the stand-by mode.

2. The electronic device of claim 1, wherein the first and second encapsulations have different orientations.

3. The electronic device of claim 1, wherein the first, second and third antennas have different orientations.

4. The electronic device of claim 1, further comprising:

a fourth and a fifth antenna;

fourth RF circuitry and fifth RF circuitry, the fourth RF circuitry being connected to the fourth antenna and the fifth RF circuitry being connected to the fifth antenna and each of the fourth and the fifth RF circuitry comprising one or more of a Low Noise amplifier, a Mixer, a Local oscillator, a Phase locked loop, an analog filter, a Voltage Gain Amplifier, an ADC, a digital filter, a Power Amplifier and a DAC; and wherein the fourth antenna is integrated together with the fourth RF circuitry in the first encapsulation, wherein the fifth antenna is integrated together with the fifth RF circuitry in the second encapsulation, and wherein the first and second antennas have vertical polarization and the fourth and fifth antennas have horizontal polarization.

5. The electronic device of claim 1, wherein all of the RF circuitries being set to the operating mode communicates with a first network, NW, node.

6. The electronic device of claim 1, wherein the first RF circuitry communicates with a first network (NW) node when in the operating mode and the second RF circuitry communicates with a second NW node when in the operating mode.

7. The electronic device of claim 1, wherein the first, second and third antennas have different orientations and wherein the orientations of the first, second and third antennas are separated with at least 90 degrees in at least one of an XY-, YZ-or XZ-plane.

8. The electronic device of claim 1, wherein the third RF circuitry comprises one or more of a Low Noise amplifier, a Mixer, a Local oscillator, a Phase locked loop, an analog filter, a Voltage Gain Amplifier, an analog to digital converter (ADC) a digital filter, a Power Amplifier and a digital to analog converter (DAC).

9. A wireless communication apparatus, comprising:

a baseband processor; and first, second, and third radio frequency (RF) circuitries coupled to the baseband processor via a zero-intermediate frequency (zero-IF) signal;

wherein the baseband processor is configured to:

set one or more of the first, second, and third RF circuitries in an operating mode, in which reception and/or transmission of radio signals is performed via an antenna connected to the respective RF circuitry, based on radio signal strength and information from one or more of a camera, a fingerprint sensor and a touch sensitive sensor, and set all others of the first, second, and third RF circuitries in a stand-by mode in which no reception or transmission of radio signals is performed.

* * * * *